US012590761B2

(12) United States Patent
Lemaire et al.

(10) Patent No.: US 12,590,761 B2
(45) Date of Patent: Mar. 31, 2026

(54) DIRECT FLAME PREHEATING SECTION FOR A CONTINUOUS METAL STRIP PROCESSING LINE

(71) Applicant: FIVES STEIN, Maisons-Alfort (FR)

(72) Inventors: Sébastien Lemaire, Maisons-Alfort (FR); Jean-Pierre Lipp George, Maisons-Alfort (FR); Camille Moukarzel, Maisons-Alfort (FR); Patrice Sedmak, Maisons-Alfort (FR); Abou Ba, Maisons-Alfort (FR)

(73) Assignee: FIVES STEIN (FR)

( * ) Notice: Subject to any disclaimer, the term of this patent is extended or adjusted under 35 U.S.C. 154(b) by 448 days.

(21) Appl. No.: 18/027,651

(22) PCT Filed: Sep. 23, 2021

(86) PCT No.: PCT/FR2021/051637
§ 371 (c)(1),
(2) Date: Mar. 22, 2023

(87) PCT Pub. No.: WO2022/064149
PCT Pub. Date: Mar. 31, 2022

(65) Prior Publication Data

US 2023/0383375 A1 Nov. 30, 2023

(30) Foreign Application Priority Data

Sep. 23, 2020 (FR) ....................................... 2009674
Sep. 23, 2020 (FR) ....................................... 2009675

(51) Int. Cl.
*F27B 9/12* (2006.01)
*C21D 1/52* (2006.01)
(Continued)

(52) U.S. Cl.
CPC .................. *F27B 9/12* (2013.01); *C21D 1/52* (2013.01); *C21D 1/767* (2013.01); *C21D 9/561* (2013.01);
(Continued)

(58) Field of Classification Search
CPC ... C21D 9/561; F27B 9/12; F27B 9/28; F27B 9/3005; F27B 2009/122; F27D 13/00; F27D 99/0033
See application file for complete search history.

(56) References Cited

FOREIGN PATENT DOCUMENTS

| | | | |
|---|---|---|---|
| DE | 102013105378 | A | 8/2014 |
| FR | 2916764 | A1 | 12/2008 |
| JP | 60125330 | A | 7/1985 |

OTHER PUBLICATIONS

DE 102013105378 B3 machine translation and original document (Year: 2013).*

(Continued)

*Primary Examiner* — Tima M. Mcguthry-Banks
(74) *Attorney, Agent, or Firm* — The Belles Group, P.C.

(57) ABSTRACT

Direct flame preheating section for continuous metal strip processing lines, comprising a connecting zone between an active zone provided with burners capable of operating in "no flame" mode and a recuperative zone for preheating the strip by exchange with combustion fumes originating from the active zone, the connecting zone having chambers capable of orienting the flow of fumes such that they flow head-on relative to the strip when exiting the active zone and entering the recuperative zone depending on the direction of flow of the fumes.

11 Claims, 7 Drawing Sheets

(51) Int. Cl.

| | |
|---|---|
| ***C21D 1/767*** | (2006.01) |
| ***C21D 9/56*** | (2006.01) |
| ***F27B 9/28*** | (2006.01) |
| ***F27B 9/30*** | (2006.01) |
| ***F27D 13/00*** | (2006.01) |
| ***F27D 99/00*** | (2010.01) |

(52) U.S. Cl.
CPC .............. *F27B 9/28* (2013.01); *F27B 9/3005* (2013.01); *F27D 13/00* (2013.01); *F27D 99/0033* (2013.01); *F27B 2009/122* (2013.01)

(56) References Cited

OTHER PUBLICATIONS

EP 2167695 B1 machine translation and original document (Year: 2017).*

* cited by examiner

[Fig. 1]
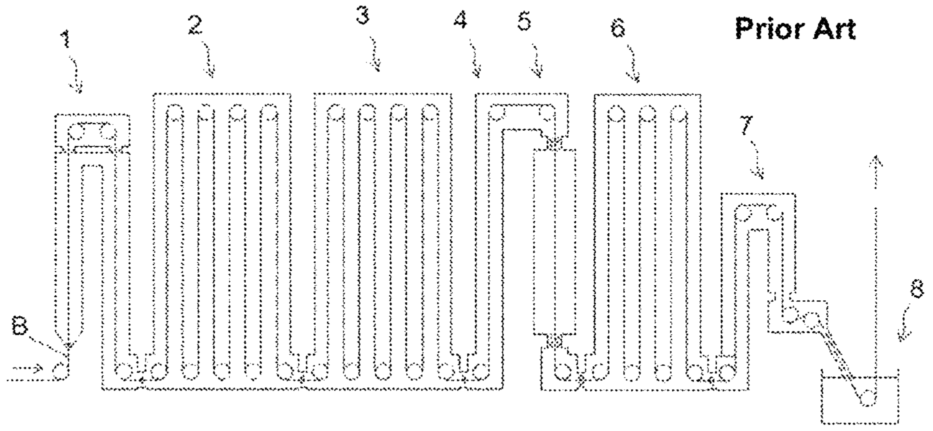
[Fig. 2]
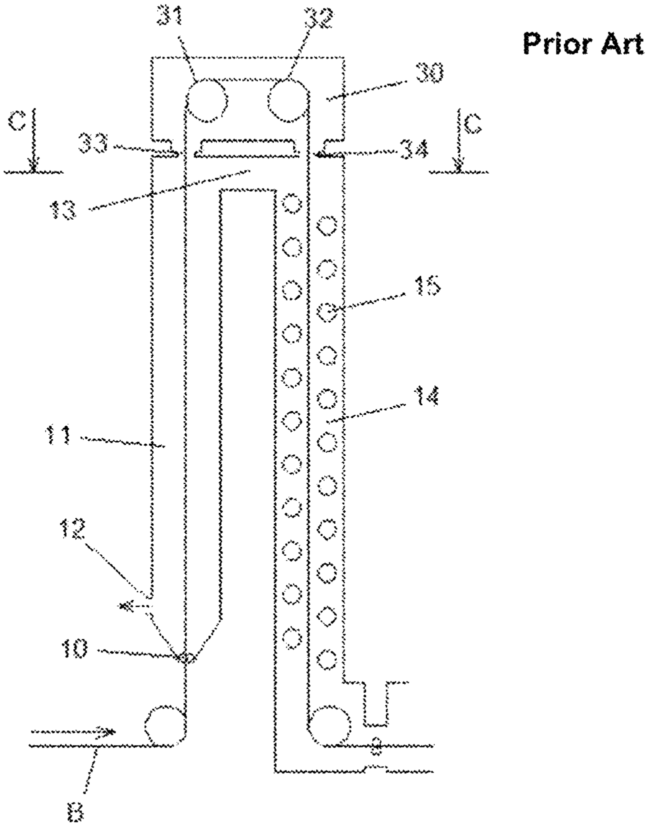

[Fig.3]
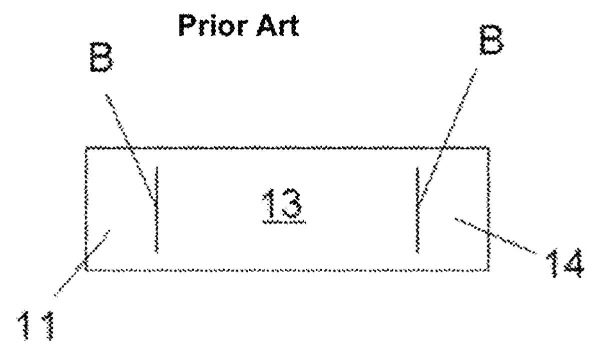
[Fig.4]
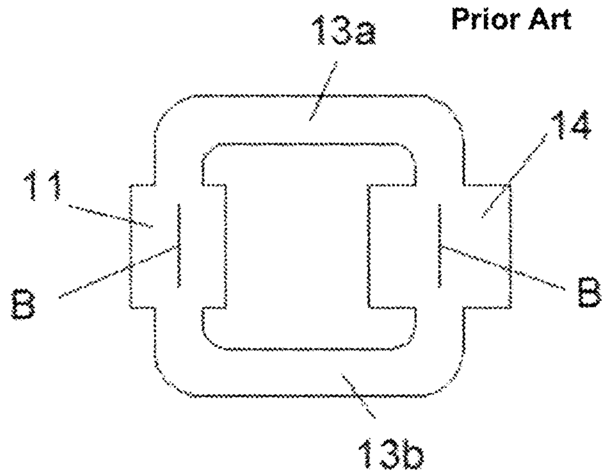
[Fig.5]
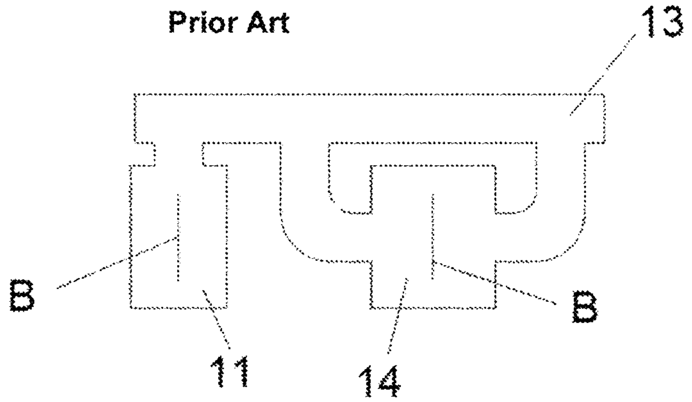

[Fig.6]
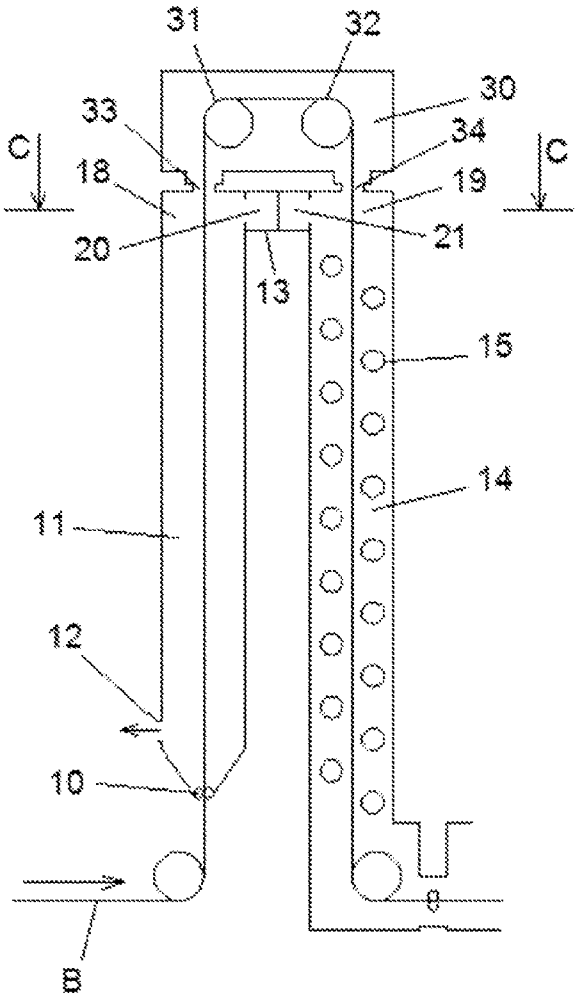
[Fig.7]
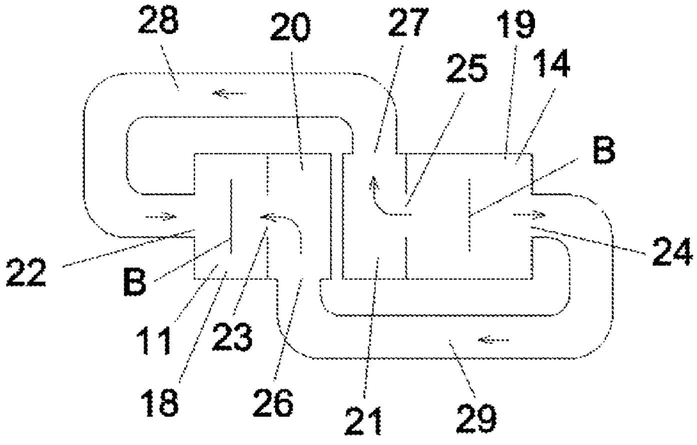

[Fig.8]
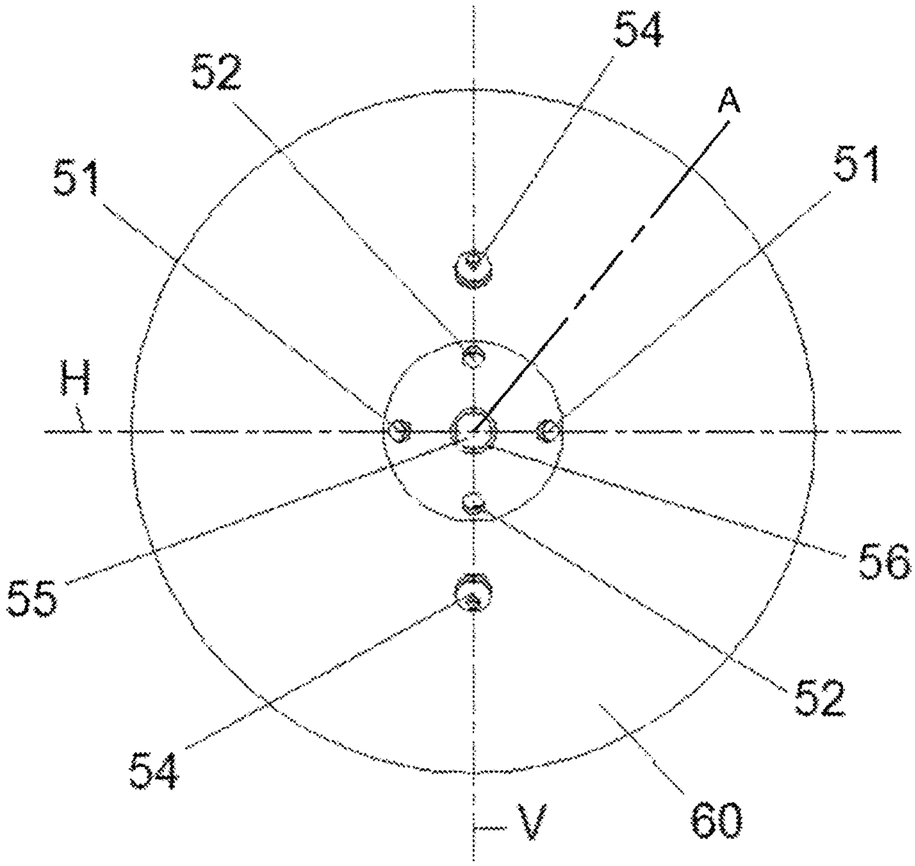

[Fig.9]
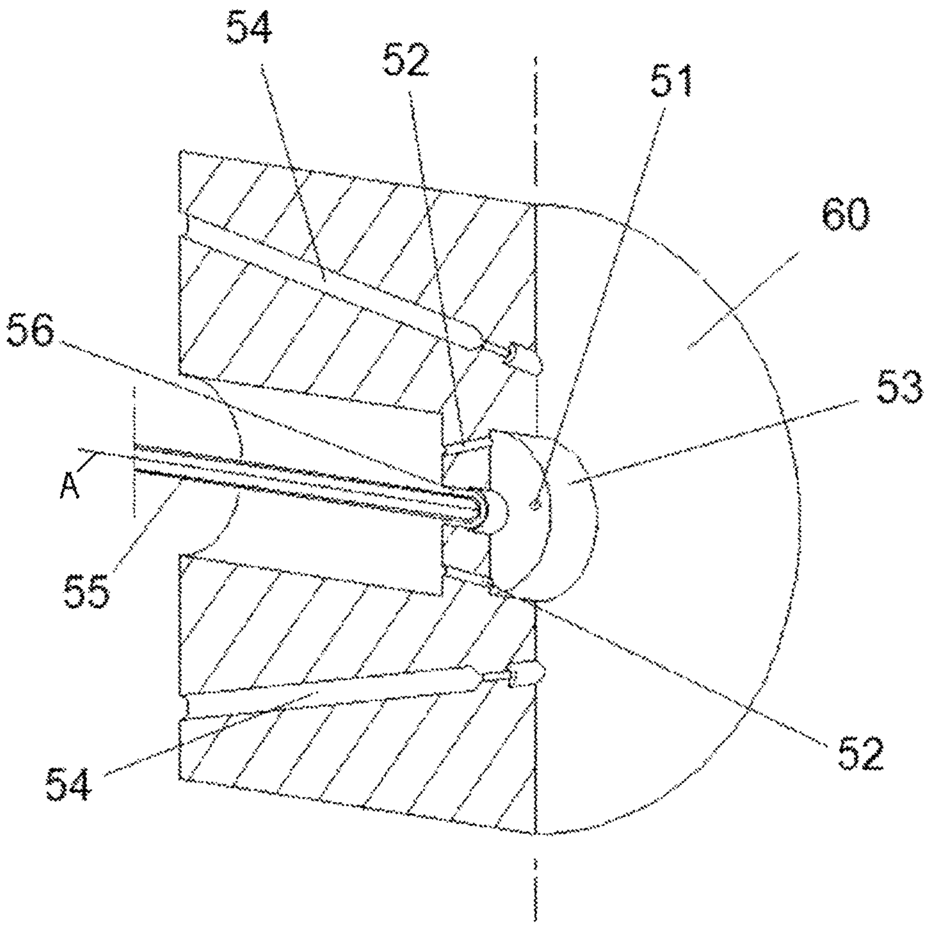

[Fig 10] Prior Art
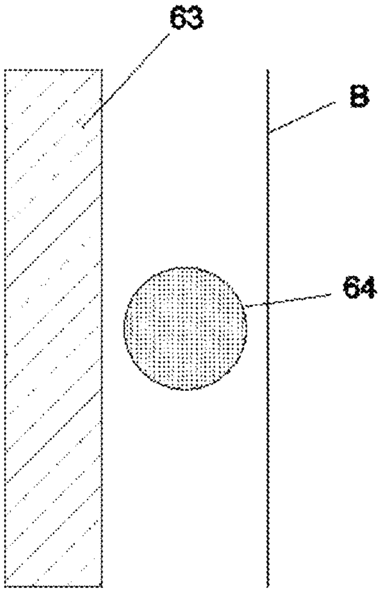
[Fig 11] Prior Art
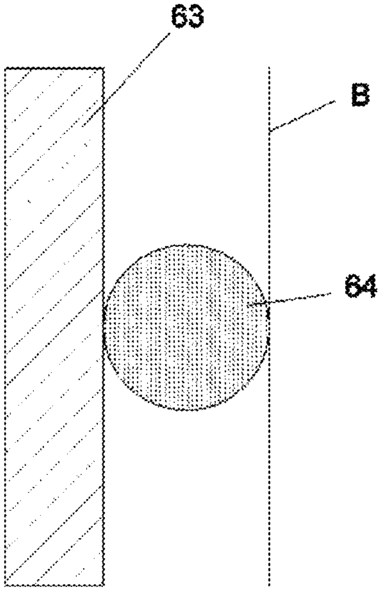

[Fig 12]
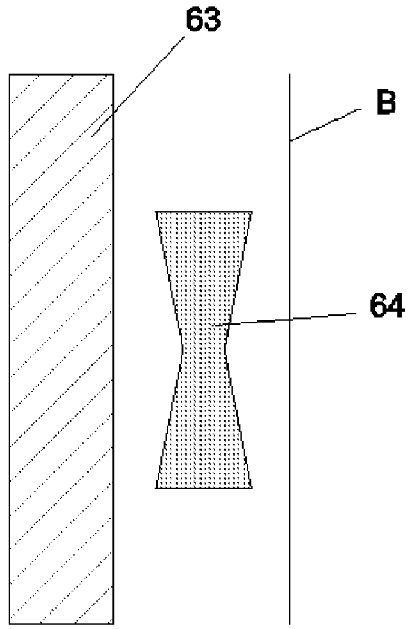

DIRECT FLAME PREHEATING SECTION FOR A CONTINUOUS METAL STRIP PROCESSING LINE

CROSS-REFERENCE TO RELATED PATENT APPLICATIONS

The present application is a U.S. national stage application under 35 U.S.C. § 371 of PCT Application No. PCT/FR2021/051637 filed Sep. 23, 2021, which claims priority to French Patent Application Nos. 2009674 and 2009675, both filed Sep. 23, 2020. The disclosures of the aforementioned priority applications are incorporated herein by reference in their entireties.

DESIGNATION OF THE RELEVANT TECHNICAL FIELD

The invention relates to continuous horizontal or vertical annealing or galvanizing lines for metal strips, and more particularly to vertical direct flame pre-heating sections of these lines, sometimes called "NOF sections," NOF being the abbreviation for "Non Oxidizing Furnace," or "DFF section," DFF being the abbreviation for "Direct Firing Furnace."

The invention aims to ensure that the pre-heating section makes it possible to perform effective preheating of the strip with a good temperature and surface condition homogeneity over the width of the strip. It also aims to avoid or to control the interaction between the combustion reagents and the surface of the strip, while limiting atmospheric emissions.

Technical Problems Addressed by the Invention

A direct flame preheating section is generally arranged at the entrance of a furnace of a hot-dip galvanizing line or an annealing line.

Referring to the diagram of FIG. 1 of the appended drawings, a galvanization line according to the prior art, and more specifically a vertical furnace, can be seen partially and schematically shown. From the entry of the line, according to the direction of movement of the strip, a direct flame pre-heating section 1, a radiant tube heating section 2, a radiant tube holding section 3, a slow cooling section 4, a rapid cooling section 5, an aging section 6, a furnace outlet section 7 and a coating section 8 are found.

The direct flame preheating section has the following main features:

- Heating the strip from ambient temperature to a desired temperature, for example varying from 500° C. to 750° C. for steel, depending on its grade.
- Eliminating the oil introduced by the cold rolling process and the oxide fines formed during or after cold rolling that are present on the strip.
- Preparing the surface of the strip for the coating process by eliminating the oxides present on the surface.

The direct flame preheating section comprises two zones: an active zone where the burners are installed which make it possible to heat the strip to the temperature defined by the thermal cycle, and a recuperative zone where the strip is preheated to a temperature below 250° C. in order to prevent its oxidation, and this by consuming the heat contained in the fumes coming from the active zone.

Referring to the diagram of FIG. 2 of the appended drawings, an enlargement of the pre-heating section of FIG. 1 can be seen. In the direction of movement of the strip, it comprises an inlet port 10 separating atmospheres between the ambient air and the atmosphere present inside the furnace.

It is followed by a vertical recuperative zone 11 in which the strip is preheated by the combustion fumes. In this case, as in the whole of the preheating section, the fumes circulate in the opposite direction to the strip. In the vicinity of the inlet of the recuperative zone, near the atmosphere separation port 10, an outlet 12 makes it possible to conduct the fumes to an additional energy recuperative zone (not shown), outside the pre-heating section, by means of an exhauster that is also not shown. The fumes leave the preheating section at a temperature generally of between 700° C. and 900° C.

The additional energy recuperative zone makes it possible to further consume the fumes by further lowering the temperature thereof. It may comprise a heat exchanger making it possible to transfer heat energy from the fumes to another fluid, for example air used to supply the burners of the preheating section and thus limit the fuel consumption.

The direct flame preheating section may be horizontal or vertical, depending on whether the strip circulates horizontally or vertically. On a vertical line, the preheating section is always vertical. On a horizontal line, the preheating section is generally horizontal, but it may also be vertical, in particular to limit the length of the line.

In a horizontal pre-heating section, the active zone and the recuperative zone follow one another without changing the direction of the strip. The fumes coming from the active zone thus flow toward the recuperative zone while preserving a good distribution of the fumes over the width of the strip.

In a vertical pre-heating section, as shown in FIG. 2, the active zone and the recuperative zone are generally on two different branches of strip, one ascending for the recuperative zone and the other descending for the active zone. A deflector roller 31, 32 for a 90 degrees change in direction of the strip is arranged at the top of each zone. Between the two deflector rollers, the strip circulates horizontally in the same clockwise direction. At the outlet of the active zone, the temperature of the furnace is very high, for example 1350° C. In order to prevent the deflector rollers from being exposed to this temperature level, they are placed in a separate zone 30, in which the temperature is lower. The fumes pass from the active zone to the recuperative zone in at least one connecting tunnel 13, without passing through this separate zone 30 where the deflector rollers are placed by means of the recesses 33, 34 installed at the inlet and outlet thereof on the ascending and descending branches of the strip.

The flow of the fumes in the existing connecting tunnel configurations leads to heterogeneous distribution of the fumes over the width of the strip. This causes temperature heterogeneity over the strip width and a disparate concentration of chemical species on the surface of the strip. This results in a different surface condition over the width of the strip at the outlet of the preheating section.

Direct flame burners of the active zone must preheat the strip with a good temperature homogeneity over the width of the strip. They must have a low energy consumption and emit little polluting waste, in particular nitrogen oxides (NOx).

The burners must also be able to operate in reducing mode, that is, by being under-supplied with oxidizer, in order to reduce as much as possible the presence of oxygen near the strip and thus prevent its oxidation. Although it is accepted that a low oxygen level of a few hundred ppm close to the strip is admissible, it is nevertheless necessary to seek to approach zero oxygen near the strip.

With the emergence of steels of high mechanical strength, the content of alloy elements such as Mn, Si and Al has increased. These elements, which are oxygen-free, are easily oxidized. Despite an overall reductive atmosphere in the preheating section and in the sections located downstream, such as the radiant heating and holding tubes sections, oxides of these alloy elements are inevitably formed in these sections under normal operating conditions. In a galvanizing line, if these oxides are present on the surface of the strip before it is immersed in the zinc bath, they lead to coating defects. To remedy this problem, it is known to carry out selective oxidation, or pre-oxidation, of these alloy elements in the preheating section so as to avoid their diffusion on the surface of the strip. The oxides formed are then reduced in the radiant tube sections. This requires slightly oxidizing conditions at the outlet of the preheating section, with fine control of the air/gas ratio of the burners. It is also necessary to have a homogeneous temperature (+/−10° C.) over the strip width so that the nature and thickness of the layer of oxides are constant over the width of the strip.

Furthermore, to limit investment and maintenance costs, the number of burners as well as control and regulation members thereof must be reduced.

Existing solutions do not allow all these requirements to be combined. The invention makes it possible to overcome these problems.

TECHNICAL BACKGROUND

In a direct flame vertical preheating section according to the prior art, the fumes pass from the active zone to the recuperative zone in at least one connecting tunnel according to three configurations.

In the first configuration shown in FIGS. 2 and 3, the connecting tunnel 13 is longitudinal, that is to say, it connects the active zone 14 and the recuperative zone 11 by a horizontal section extending in the run direction of the strip B. FIG. 3 corresponds to a top view along the section plane CC of FIG. 2. In this configuration, the two vertical branches of the strip at the tunnel constitute obstacles to the flow of the fumes that a portion thereof must bypass. Vortices of fumes (vortex) form in some places, in particular at the inlet of the recuperative section in the direction of flow of the fumes. The result is a heterogeneity of distribution of the fumes over the width of the strip leading to a difference in temperature and surface condition over the width of the strip.

In the second configuration shown in FIG. 4, in a sectional view similar to that of FIG. 3, a lateral connecting tunnel 13*a*, 13*b* is arranged on each side of the preheating section. The inlets of the fumes on the side of the active zone 14 and their outlets on the side of the recuperative zone 11 are produced laterally, on the sides of the strip B. This results in an asymmetry over the width of the strip, the distribution of the fumes being greater on the edges of the strip than in its center.

In the third configuration shown in FIG. 5, in a sectional view similar to that of FIGS. 3 and 4, the aspiration of the fumes at the outlet of the active section 14 is carried out symmetrically on each face of the strip, but the reinjection thereof, at the inlet of the recuperative section 11, is carried out laterally on only one side of the strip. This results in an asymmetry of distribution of the fumes over the width of the strip.

The burners that equip the vertical direct flame preheating sections are grouped together in two large categories, the so-called front burners and the so-called side burners, depending on their position relative to the strip.

The so-called front burners are placed facing the strip. There are two different types of front burners: front burners with mixing at the nose and premix front burners. The front burners develop a short flat spiral flame so as to avoid impacting and oxidizing the strip. This technology is the most widespread, in particular because it makes it possible to modulate the temperature profiles over the width of the strip by adjusting the heating distribution between the burners. However, this technology is expensive in terms of investment and maintenance, since it requires a large number of burners to cover the entire width of the strip (between three burners and nine burners depending on the strip width and the unit power of the burners) and a complex regulation system for adjusting the power and the air/gas ratio per burner. These burners operate with hot air when it involves front burners with mixing at the nose (typically air preheated to 550° C.) or with cold or slightly preheated air (temperature below 300° C.) when it involves premix front burners. Generally, with front burners, at least one zone of the preheating section is equipped with premix burners which leads to excess consumption of fuel compared to hot air burners.

The so-called side burners are placed on the side of the strip. They create a flame in the width of the furnace, parallel to the strip. This technology is simpler and more economical, since it requires only one burner per row to cover the entire width of the strip on one face. Furthermore, the mode of regulating air/gas ratios takes place by section, for a set of burners. These burners operate with hot air (usually 500° C.) with fuel savings as a consequence. However, these burners according to the prior art have fairly high NOx emission levels, typically 250 mg/Nm3 at 3% oxygen compared to 120 mg/Nm3 for front burners. In addition, the temperature heterogeneity of their flame over the width of the preheating section is impacted by the process and must be corrected by means other than the burner itself. Thus, the temperature difference over the width of the strip may vary between +/−20° C. under moderate production and temperature conditions at the outlet of the pre-heating section (600° C.), at +/−50° C. for outlet temperatures of around 720° C.

To attempt to overcome this problem, hybrid pre-heating sections exist that combine the two categories of burners. In the last zone, the side burners are replaced by cold air premix front burners. This solution makes it possible to correct the problem of temperature heterogeneity at the outlet of the pre-heating section, but the other drawbacks cited above are the same.

Furthermore, these front or side burners according to the prior art incorporate a conventional design. Combustion between the gas and the air is initiated in a combustion tunnel and develops in the furnace according to a thermal and chemical distribution that is more or less difficult to control over the width of the strip. The applicant has no knowledge of a burner operating in no flame mode in the pre-heating sections of continuous lines. The features of the no flame combustion mode, resulting from diffuse combustion, have been widely studied and the limitations are rather well identified. In a confined environment, however, this combustion mode is difficult to apply, since it requires combustion chamber volumes to match the large quantity of recirculated fumes necessary to obtain diffuse combustion.

Referring to the diagram of FIG. 10 of the appended drawings, the frontal shape of the flame with a side burner operating in flame mode according to the prior art can be seen schematically. The flame is developed between the strip B and the refractory wall 63 of the combustion chamber. The flame has a circular section 64 which occupies only a portion of the volume between the strip and the wall of the furnace. This flame shape has the advantage of limiting the risk of oxygen presence at the surface of the strip and prevents the overheating of the refractories because there is no contact of the flame with the wall of the furnace. However, this type of flame has the aforementioned drawbacks in terms of temperature homogeneity and NOx emission. With no flame combustion, combustion is more homogeneous but it extends in volume. FIG. 11 is similar to FIG. 10 but for a side burner operating in no flame mode according to the prior art. The section of the flame is still substantially circular but it occupies the volume available between the strip and the wall of the furnace. This configuration is advantageous in terms of NOx emission, but it causes a high probability of oxygen presence in the vicinity of the strip, hence an uncontrolled oxidation risk and, on the other side of the flame, a higher wall temperature, detrimental to the maintenance of the refractory.

SUMMARY OF THE INVENTION

According to a first aspect of the invention, a direct flame preheating section is proposed for a continuous metal strip processing line comprising a connecting zone intended for circulating the combustion fumes coming from an active zone equipped with burners toward a recuperative zone for preheating the strip by exchange with said fumes, the burners being able to operate in “no flame” mode. Said connecting zone comprises an outlet chamber capable of orienting the flow of the fumes so that they flow head-on relative to the strip when exiting the active zone and an inlet chamber capable of orienting the flow of the fumes such that they flow head-on relative to the strip when entering the recuperative zone, depending on the direction of flow of the fumes.

The outlet chamber is arranged at the outlet of the active zone, in the direction of flow of the fumes, and is arranged for drawing off fumes, the inlet chamber is arranged at the inlet of the recuperative zone and is arranged for injecting fumes, the connecting zone further comprising two turn chambers each arranged to make the flow of fumes turn 90 degrees between an inlet opening and an outlet opening, a first turn chamber communicating directly with the outlet chamber and a second turn chamber communicating directly with the inlet chamber, and two connecting tunnels provided arranged for circulating the fumes, a first connecting tunnel directly connecting the outlet opening of the first chamber with an inlet opening of the inlet chamber and a second connecting tunnel directly connecting an outlet opening of the outlet chamber and the inlet opening of the second chamber.

The two circuits are substantially symmetrical in order to obtain a balanced distribution of the fumes over the two faces of the strip, contributing to good temperature homogeneity.

The two outlet openings of the outlet chamber are arranged opposite and head-on relative to a circulation of the strip in the active zone, and the two inlet openings of the inlet chamber are arranged opposite and head-on relative to a circulation of the strip in the recuperative zone.

This arrangement promotes the distribution of the flow of the fumes over the width of the strip in the connecting zone and over the length of the active and reactive zones. This results in better temperature homogeneity and surface condition over the width of the strip compared to a solution where the injection and/or drawing off of the fumes is carried out laterally, in a direction parallel to the direction defined by the width of the strip.

In addition, the absence of the strip in the chambers in which the flow of the fumes performs a 90 degrees turn contributes to the homogeneity of the distribution of the fumes over the width of the strip.

The width and length dimensions on a horizontal plane of the connecting zone chambers where the strip is located are the same as those of the active and recuperative zones that they extend. Thus, the section of the chamber that extends the recuperative zone is smaller than that of the chamber that extends the active zone. The chambers intended for orienting the flow of the fumes, their openings and the connecting ducts between the chambers are dimensioned so that the fumes flow into the chambers where the strip is located in a direction perpendicular to one face of the strip and so that the distribution of the fumes is homogeneous over the width of the strip.

The chambers of the connecting zone in which the flow of the fumes performs a 90 degrees turn are located between the rising branch and the descending branch of the strip. They are located at the same level over the height of the preheating section as the chambers where the strip is located and they are aligned with them longitudinally, in the direction of movement of the strip in the line. The horizontal space usually available between the active zone and the recuperative zone of a direct flame pre-heating section according to the prior art is sufficient for the location of the two chambers in which the flow of the fumes performs a 90 degrees turn. This space may nevertheless be slightly increased, if necessary, to obtain a good distribution of the fumes and a flow thereof over the width in a direction perpendicular to the direction defined by the width of the strip.

According to a second aspect of the invention, the burners are of the lateral, direct flame type, said burners being able to operate in no flame mode, for example when the internal temperature of the active zone in the vicinity of the burners is greater than 850° C.

This type of combustion is very low-E in the ultraviolet range. The flame is almost invisible to the naked eye, hence the expression no flame mode. The limits of the flame are less well defined, since the combustion products are very homogeneous and mix with the fumes of the furnace.

In no flame mode, combustion is highly diluted in several volumes of fumes. This operating mode is accessible either by recirculating the fumes locally within the combustion chamber or by taking up a part of the fumes elsewhere, for example directly to the flue, and by reinjecting them into the burner. However, this latter possibility is more complex to implement. To obtain sufficient recirculation locally within the combustion chamber in order to operate in no flame mode without requiring external recirculation, it is necessary to have an injection of air and gas at high speeds into the combustion chamber. The geometry of the burner and that of the combustion chamber create recirculations of the combustion products to the burner, thus diluting the oxidizer and the fuel with the combustion products before the reaction.

In normal operation, that is, outside the temperature increase and decrease phases of the furnace, during the stopping and restarting of the line, the internal temperature of the active zone is greater than 850° C. The burners therefore mainly operate in no flame mode.

The combination of burners operating no flame and a connecting zone between the active zone and the recuperative zone of the pre-heating section according to the invention makes it possible to obtain good temperature and surface condition homogeneity over the width of the strip from the inlet thereof in the preheating section to the outlet thereof. This combination is necessary to obtain this good homogeneity over the width of the strip at the outlet of the pre-heating section, since significant heterogeneity present on the strip at the inlet of the active zone that would result from a connecting zone according to the prior art could not be corrected in the active zone. Indeed, the volume combustion of the no flame mode of side burners does not make it possible to adjust the power delivered to the strip over its width.

The temperature difference over the width of the strip is thus limited to about +/−10° C. at the outlet of the preheating section, which makes it possible to obtain mechanical properties and a homogeneous layer of oxides over the width of the strip, in the case of selective oxidation.

Operating in no flame mode makes it possible to limit the temperature reached by the combustion products compared to a flame combustion mode. Thus, in operation with an air factor of 0.95, the burner according to the invention operating in no flame mode makes it possible to lower the hot spot in the flame to about 1450° C., that is, barely 100° C. above the temperature of the refractories. For comparison, for the same operating conditions, the front burners according to the prior art have flame temperatures exceeding 1700° C.

The formation of NOx being directly related to the flame temperature, the burner according to the invention has a substantially lower NOx emission rate than the burners according to the prior art when operating in no flame mode. Furthermore, the analyses of chemical species within the flame show better homogeneity compared to conventional combustion. The low local oxygen content also contributes to the reduction in the NOx level.

Switching to no flame mode from a temperature of 850° C. ensures good combustion in the volume of the chamber, this temperature level enabling self-ignition of the fuel. Below this temperature, the burner operates in flame mode with a slightly oxidizing combustion setting.

The burner according to the invention is capable of operating with combustion air preheated to 600° C., with no significant impact on NOx emissions. Energy recuperators now have an efficiency that makes it possible to reach preheated air temperatures close to 600° C. However, the production of NOx on conventional burners is very dependent on the air temperature levels with an exponential evolution curve. The air temperature on these burners is therefore limited. This evolution of the NOx as a function of the air temperature is clearly flatter and more linear in a diffuse combustion, which makes it possible to bring the air temperature to 600° C. This higher air temperature limits the fuel consumption and promotes the recirculation of the fumes and the homogeneity of the species in the combustion chamber.

The preheating of the combustion air may be carried out in a heat exchanger in which the fumes leaving the preheating section are circulated. Although cooled by exchange with the strip in the recuperative zone, their temperature level is still sufficient to preheat the combustion air.

The burners have an axial direction A at the intersection of a vertical plane V and a horizontal plane H, and comprise a diffuser traversed by fuel injection ducts for operation in no flame mode and oxidizer injection ducts. Said oxidizer injection ducts emerge from the diffuser closer to the burner axis than said fuel injection ducts for operation in no flame mode. The burners have oxidizer injection ducts that emerge from the diffuser on the vertical plane and that are divergent, and others that emerge from the diffuser on the horizontal plane and that converge toward the axis of the burner.

The fuel and oxidizer injection ducts are arranged so as to obtain the desired distribution of the fuel and oxidizer in the volume of the combustion chamber delimited by one face of the strip and the side and front walls of the furnace in order to obtain no flame combustion. The resulting volume combustion makes it possible to obtain good distribution of the combustion products and thus good temperature homogeneity over the width of the strip.

For this purpose, the burners are positioned in the preheating section with their vertical plane arranged parallel to the strip.

At the outlet of the injection ducts, the oxidizer spreads in the vertical direction and contracts in the horizontal direction. The fuel jets have less propulsion than that of the oxidizer jets. The fuel is aspirated by the oxidizer with which it reacts, constituting an envelope for the air flow which protects the strip from oxidation. In the same way, the propulsion of the oxidizer jets aspirates fumes to recirculate them.

Thus, although the strip is in the immediate vicinity of the burners, the axis of the burners is typically located at about 400 mm from the strip, so the presence of oxygen in the vicinity of the strip as well as the oxidation thereof is avoided.

This criterion of the near-strip oxygen is critical for using no flame side burners in a preheating section, since no flame burners generally require larger combustion chamber volumes to reach a maximum recirculation of fumes. If the confinement of the chamber does not allow it, the combustion spreads and the residual oxygen present within the flame pollutes the strip.

For an application in a preheating section, it is therefore not sufficient to homogenize the oxygen level in the flame as in a conventional flame burner. It is also necessary not to increase the size of the reaction zone. In other words, the width of the flame must not be increased. However, no flame combustion is generally more extensive than conventional combustion.

The no flame combustion regime is based on the necessary presence of a high intensity recirculation zone around the reagent jets in the furnace enclosure. The fuel and air jets must therefore have sufficient propulsion to be able to drive and mix with the aspirated fumes. The propulsions of the oxidizer and fuel jets used according to the invention guarantee an overall recirculation rate of six of the fumes around the jets, which is sufficient for the no flame combustion. This implies that, on average, the jet of oxidizer or fuel is diluted in six volumes of fumes.

Furthermore, no flame burners do not have a combustion tunnel. However, the latter contributes to initiating very early reactions on a conventional burner. The detrimental consequence for an application of no flame burners in a pre-heating section would be to impact the wall located facing the burner, which would accelerate its degradation. For this reason, it is also necessary to contain the length of the flame.

The arrangement of the fuel and oxidizer injection ducts of the burners according to the invention addresses these constraints.

Each of the oxidizer injection ducts can be arranged on the vertical plane and the horizontal plane. The ducts that emerge on the vertical plane can be divergent and the ducts that emerge on the horizontal plane can be convergent toward the axis of the burner.

The oxidizer injection ducts of the burners that emerge from the diffuser on the vertical plane are divergent at an angle of between 2 and 12 degrees, and preferably of seven degrees.

The oxidizer injection ducts of the burners that emerge from the diffuser on the horizontal plane are convergent at an angle of between 1 and 5 degrees, and preferably of three degrees.

The fuel injection ducts of the burners for operation in no flame mode are convergent toward the burner axis.

They converge at an angle of between five and fifteen degrees and preferably of eleven degrees.

These angles on the fuel and oxidizer ducts, combined with the injection speeds and propulsion of the jets, are particularly suitable for the usual dimensions of a direct flame preheating section. The propulsion and the injection angle of the air jets are predominant, the propulsion of the fuel jets being lower.

As can be seen by referring to FIG. 12 of the appended drawings, the arrangement of the fuel and oxidizer injection ducts according to the invention makes it possible to obtain a flame whose section is an X shape. Thus, the flame extends in the vertical direction and contracts in the horizontal direction.

No flame burners are unstable when cold. Indeed, on these burners, the flames are detached and develop in a diffuse manner in the furnace. When cold, when the self-ignition temperature is not reached, this poses a problem, because in the event of detachment of flame, the burner secures the entire zone of the preheating section. The zone must then be purged in order to be able to restart. It is therefore appropriate to have a heating mode that is very stable under cold conditions in order to raise the furnace to temperature.

To respond to this limitation, the burners comprise a second fuel injection duct for flame mode operation that extends in the axial direction of the burner and that emerges from the diffuser into the burner axis.

The burners also have an annular duct for supplying combustion air around the fuel injection duct for flame mode operation. This air contributes to the attachment of the flame.

The burners according to the invention are particularly suitable for operation with natural gas and steel industry gas, in particular coke oven gas (COG).

The burner according to the invention makes it possible to obtain NOx levels of less than 100 mg/Nm3 to 3% oxygen for a furnace at 1350° C., a default combustion setting of air and combustion air preheated to 600° C. The residual oxygen near the strip is about 20 ppm over the entire width of the strip.

The residual oxygen content close to the strip is weak and homogeneous over the width of the strip. It varies slightly according to the air/gas ratio, in the order of 20 ppm for an air/gas factor of 0.90 and 25 ppm for an air/gas factor of 0.95.

Burners arranged at the inlet of the active zone, in the direction of travel of the strip, operate in a stoichiometric atmosphere while the others, the majority of the burners, operate in the absence of air. The operation of these burners in stoichiometric atmosphere makes it possible to produce fumes which will burn/crack the hydrocarbons present at the surface of the strip. The operation in absence of air of other burners makes it possible to obtain reductive fumes that will reduce the iron oxides present on the surface of the strip.

The burners of the preheating section are thus distributed in at least two regulation zones. The atmosphere in the section is controlled along the active zone by varying the air/gas ratio in the different regulation zones.

Certain flat products arriving on the market, in particular third-generation steels, require selective pre-oxidation of the surface of the strip. In order to obtain this pre-oxidation, the preheating is carried out in several steps with one step in a very slightly oxidizing zone. In the latter, combustion must be finely adjusted around the targeted air/gas factor, generally between 1.01 and 1.05. The new burner design according to the invention is compatible with this use. The distribution of the near-strip oxygen is very homogeneous, at +/−0.1%. It is thus possible to produce identical selective oxidation over the entire width of the strip, all the more so since the temperature homogeneity of the strip is also improved. The thickness of the oxide layer on the steel is thus controlled by simple management of the excess air in this zone. The advantage of this feature is beneficial, since it avoids a complex chamber dedicated to the selective oxidation of the strip.

According to a second aspect of the invention, a continuous metal strip processing line comprising a direct flame preheating section as described above is proposed.

BRIEF DESCRIPTION OF THE DRAWINGS

Other features and advantages of the invention will become apparent on reading the following detailed description, for the understanding of which reference will be made to the appended drawings, in which:

FIG. 1 is a schematic overview of a galvanizing line with a direct flame preheating section according to the prior art, FIG. 2 is an enlargement of the pre-heating section of FIG. 1, FIG. 3 is a schematic top and sectional view of the preheating section according to FIG. 2, FIG. 4 is a schematic top and sectional view of a preheating section according to a second example of the prior art, FIG. 5 is a schematic top and sectional view of a preheating section according to a third example of the prior art.

FIG. 6 is a schematic view similar to FIG. 2, but for a direct flame preheating section according to one embodiment of the invention, FIG. 7 is a schematic top and sectional view of the preheating section similar to those of FIGS. 3 to 5, but for the preheating section according to FIG. 6, FIG. 8 is a schematic front view of the diffuser of a burner according to one embodiment of the invention, FIG. 9 is a schematic sectional and three-dimensional view of one half of the diffuser according to FIG. 8, FIG. 10 is a schematic side view showing the frontal shape of the flame with a burner operating in flame mode according to the prior art, for a vertical pre-heating section, FIG. 11 is a schematic view showing the frontal shape of the flame with a burner operating in no flame mode according to the prior art, again for a vertical pre-heating section, FIG. 12 is a schematic view showing the frontal shape of the flame with a burner according to the invention operating in no flame mode, again for a vertical pre-heating section.

DETAILED DESCRIPTION OF THE INVENTION

Since the embodiments described below are in no way limiting, it will in particular be possible to consider variants of the invention comprising only a selection of the features described, subsequently isolated from the other features described, if this selection of characteristics is sufficient to confer a technical advantage or to differentiate the invention from the prior art. This selection comprises at least one feature, preferably functional, without structural details, or with only a portion of the structural details if this part only is sufficient to confer a technical advantage or to differentiate the invention from the prior art.

In the rest of the description, elements having an identical structure or similar functions will be designated by the same reference signs.

Referring to the diagram of FIG. 6 of the appended drawings, a schematic view of a direct flame preheating section according to the invention can be seen. A connecting zone 13 ensures the fluidic connection between the recuperative zone 11 and the active zone 14 equipped with side burners 15.

The nature of the connecting zone 13 is similar to that of the active and recuperative zones in that it comprises a metal outer shell and an inner lining made of refractory materials.

The connecting zone 13 comprises two chambers 18, 19 in which the strip circulates, the chamber 18 at the inlet of the recuperative zone 11, in the direction of flow of the fumes, for the rising branch and the chamber 19 at the outlet of the active zone for the descending branch.

The connecting zone 13 also comprises two other chambers 20, 21 intended to orient the flow of the fumes facing the strip by making them perform a 90 degrees turn, the chamber 20 on the rising branch side and the chamber 21 on the descending branch side. They are arranged in the central part of the connecting zone, between the rising branch and the descending branch of the strip.

Due to the suction carried out by the fume exhauster, the flow of the fumes is exiting into the chambers 19, 21 arranged on the side of the active zone 14 and it is entering the chambers 18, 20 arranged on the side of the recuperative zone 11.

As shown in FIG. 7, each of the chambers 18, 19 in which the strip circulates comprises two openings 22, 23, respectively 24, 25, positioned opposite one another, facing the strip, through which the fumes enter or leave. In each of the chambers 20, 21 intended for orienting the flow of the fumes, one of the openings 23, respectively 25 (the one in connection with the chambers 18, 19 where the strip circulates) is arranged facing the strip and a second opening 26, respectively 27 is arranged at 90 degrees on a side face of said chamber.

The connecting zone 13 comprises two connecting ducts 28, 29 that channel the fumes from the active zone 14 to the recuperative zone 11. The first duct 28 connects the chambers 18 and 21 and the second duct 29 connects the chambers 19 and 20. These ducts comprise a metal outer shell and an inner lining made of refractory materials.

In its upper part, the connecting zone 13 is connected to a chamber 30 in which two deflector rollers 31, 32 are placed for the path of the strip. Two narrowed areas 33, 34 limit the circulation of the fumes in the chamber 30 so that the latter remains at a moderate temperature suited to the deflector rollers.

The active zone 14 comprises a plurality of burners 15 according to the invention arranged on the side faces thereof. Its average temperature is approximately 1350° C. The burners are staggered on each side of the furnace and staggered on each side of the strip. Thus, the burners are arranged two by two on successive horizontal planes, but the position of the burners is different between two horizontal planes. In a first horizontal plane, a burner is arranged on one side face of the furnace and on one side of the strip and the second is arranged on the opposite side face, and on the other side of the strip. The reverse is true in a second horizontal plane adjacent to the first.

The horizontal distance between the axis of the burners and the strip is for example 400 mm. The vertical distance between two burners arranged on the same face of the active zone and on the same side of the strip is for example 750 mm.

The nominal power of a burner is for example 500 kW and is generally between 400 kW and 800 kW. It may be different over the length of the preheating section. However, all the burners often have the same nominal power, and they operate in proportional mode to modulate the heat input over the length of the active zone.

The dimensioning of the burner takes into account different aspects that affect both the capacity of the line (number of tons per hour of steel strip to be reheated), the use of the no flame combustion mode, the development of the flame desired in the furnace according to the strip width and the dimensions of the cross section of the active zone, as well as taking into account the conditions of use of the burner.

As shown in FIGS. 8 and 9, the burner axial direction A is designated by reference character A, which lies at the intersection of a vertical plane V and a horizontal plane H. For this embodiment of the invention, the oxidizer passes through four ducts 51, 52. For a power of 500 kW of the burner and air preheated to 600° C., these ducts may have a diameter of 21 mm. They emerge in a small mini-tunnel 53 through holes whose axes are separated from the central axis of the burner by 100 mm. The length of the ducts 51, 52 must be at least three times their diameter in order to correctly establish the air jet at the outlet of the duct. Hot air speeds are generally between 50 and 300 m/sec, and typically 200 m/sec. The diverging orientation of the vertical jets at 7° makes it possible to spread the flame. The convergent orientation of the horizontal jets at 3° makes it possible to contract it. The greater the divergence, the greater the risk of worsening the NOx level. By increasing the convergence, there is a risk of disrupting the airflow and therefore of having an unstable flame. The range for which the operation is optimum is thus quite narrow, with +/−five degrees for the divergent vertical jets and +/−two degrees for the convergent horizontal jets.

The air holes are grouped in pairs. They must be diametrically opposite along two axes, vertical and horizontal. It is not necessary that the pairs of holes be identical. A greater spread of the flame will be obtained if the vertical and divergent air holes have a larger diameter. To maintain the same speed at the outlet of convergent and divergent oxidizer ducts, the diameter of the horizontal and convergent air holes is reduced in proportion to the increase in the diameter of the vertical and divergent holes.

The outlet of the air jets is set back relative to the diffuser plane by approximately 60 mm. This mini-tunnel 53 makes it possible to initiate the mixture of the air with the fumes and locally lowers the partial oxygen level. Its diameter is 150 mm or 1.5 times the diameter on which the outlets of the air ducts 51, 52 are arranged. Another usefulness of this tunnel is to improve the stability of the flame when the furnace is cold.

The fuel is injected through two ducts 54. The gas jets are diametrically opposite and placed in the upper and lower part on the outside of the diffuser 60 over a diameter of 250 mm. The two ducts 54 are convergent toward the axis of the burner at an angle of 11°. This feature allows the gas to be mixed with the fumes before being aspirated by the air jets. A similar principle would have been obtained by arranging the ducts 54 horizontally since the gas is aspirated by the air flow. The air/gas meeting point is approximately 30 cm from the diffuser.

The gas injection ducts 54 have a recess at their end for the speed setting of the jet, the diameter of which is 15 mm. The gas speed at the outlet is here 50 m/sec for natural gas. It is generally between 20 and 100 m/sec. The gas outlet orifices are separated by two to four times the distance between the two air outlet orifices of the same pair, horizontal or vertical. Given the inclination angle of the injectors, which can range up to 15°, the gas jets should not be too far apart due to the space requirement outside the furnace.

The gas injection ducts 54 emerge into a small cavity making it possible to protect them from the radiation of the flame and the furnace, the gas speed being produced by the recess at the end of the duct.

For cold flame stability, a conventional axial gas pipe 55, pierced with three rows of radial holes, is supplied with fuel instead of the two peripheral ducts 54 during the temperature rise phases of the furnace. As a variant, the axial gas pipe 55 is supplied with air/gas premix. The flow rate of fuel injected by the axial gas pipe represents less than 10% of the overall fuel flow rate. The aim is to have the closest possible mixture with air. The tunnel 53 of the diffuser at the air injection allows the combustion to be stabilized. However, the advantage of no flame operation will be lost. Therefore, this mode of operation is only used when the furnace has a temperature below 850° C. and with a slightly oxidizing combustion setting.

Around the axial pipe 55 of gas for cold operation, an annular combustion air passage 56 contributes to the correct ignition of the burner and to the cold flame stability. This annular passage is supplied with air like the peripheral ducts 51, 52. The combustion air flow rate in this annular passage is approximately 20% of the total combustion air flow rate. It is maintained for the two modes of operation of the burner, in flame mode and in no flame mode.

The diffuser may be made of a common refractory material for this type of application, of the same nature as that of flame-resistant burners according to the prior art.

Of course, the invention is not limited to the examples that have just been described and numerous modifications can be made to these examples without departing from the scope of the invention. In addition, the different features, forms, variants and embodiments of the invention may be associated with one another in various combinations insofar as they are not incompatible or exclusive of one another.

The invention claimed is:

1. A direct flame preheating section for a continuous metal strip processing line comprising a connecting zone provided for circulating combustion fumes coming from an active zone equipped with burners to a recuperative zone for preheating the strip by exchange with the combustion fumes, wherein the burners are capable of operating in a no flame mode and wherein the connecting zone comprises an outlet chamber capable of orienting a flow of the combustion fumes so that they flow head-on relative to the strip at an outlet of the active zone and an inlet chamber capable of orienting the flow of the combustion fumes so that they flow head-on relative to the strip at an inlet of the recuperative zone, depending on a direction of flow of the combustion fumes, wherein the outlet chamber is arranged at the outlet of the active zone, in the direction of flow of the combustion fumes, and is arranged for drawing off the combustion fumes, wherein the inlet chamber is arranged at the inlet of the recuperative zone and is arranged for injecting the combustion fumes, wherein the connecting zone further comprises two turn chambers each arranged to make the flow of the combustion fumes turn 90 degrees between an inlet opening and an outlet opening, a first turn chamber communicating directly with the outlet chamber and a second turn chamber communicating directly with the inlet chamber, and two connecting tunnels arranged for circulating the combustion fumes, a first connecting tunnel directly connecting the outlet opening of the first turn chamber to an inlet opening of the inlet chamber, and a second connecting tunnel directly connecting an outlet opening of the outlet chamber to an inlet opening of the second turn chamber.

2. The preheating section according to claim 1, wherein two outlet openings of the outlet chamber are arranged opposite and head-on relative to a circulation of the strip in the active zone and two inlet openings of the inlet chamber are arranged opposite and head-on relative to a circulation of the strip in the recuperative zone.

3. The preheating section according to claim 1, wherein the burners are positioned laterally relative to the strip so as to project combustion along a direction substantially parallel to the strip width, and are capable of operating in the no flame mode.

4. The preheating section according to claim 1, the burners having an axial direction at the intersection of a vertical plane and a horizontal plane, and comprising a diffuser traversed by fuel injection ducts for operation in no flame mode and oxidizer injection ducts, said oxidizer injection ducts emerging from the diffuser closer to the burner axis than said fuel injection ducts for operation in no flame mode, and wherein the burners have oxidizer injection ducts that emerge from the diffuser on the vertical plane and that are divergent and oxidizer injection ducts that emerge from the diffuser on the horizontal plane and that are convergent toward the burner axis.

5. The preheating section according to claim 4, wherein the vertical plane is parallel to the strip.

6. The preheating section according to claim 4, wherein the oxidizer injection ducts of the burners that emerge from the diffuser on the vertical plane are divergent at an angle of between 2 and 12 degrees.

7. The preheating section according to claim 4, wherein the oxidizer injection ducts of the burners that emerge from the diffuser on the horizontal plane are convergent at an angle of between 1 and 5 degrees.

8. The preheating section according to claim 4, wherein the fuel injection ducts of the burners for operation in no flame mode are convergent toward the burner axis.

9. The preheating section according to claim 4, wherein the fuel injection ducts for operation in no flame mode are convergent toward the burner axis at an angle of between five and fifteen degrees.

10. The preheating section according to claim 4, wherein the burners have a fuel injection duct for operation in flame mode that extends in the axial direction of the burner and that emerges from the diffuser in the burner axis.

11. A continuous metal strip processing line, comprising a direct flame preheating section according to claim 1.

* * * * *